(12) United States Patent
Hautz et al.

(10) Patent No.: US 9,300,189 B2
(45) Date of Patent: Mar. 29, 2016

(54) FLUID-COOLED ELECTRIC MACHINE

(75) Inventors: Rudolf Hautz, Pfarrkirchen (DE); Klaus Neupert, Pocking (DE); Martin Obermayr, Kaiserslautern (DE); Martin Stark, Passau (DE); Josef Watzinger, Hutthurm (DE); Josef Zwack, Pocking (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 410 days.

(21) Appl. No.: 13/812,398

(22) PCT Filed: Jun. 14, 2011

(86) PCT No.: PCT/EP2011/059844
§ 371 (c)(1),
(2), (4) Date: Jan. 25, 2013

(87) PCT Pub. No.: WO2012/013412
PCT Pub. Date: Feb. 2, 2012

(65) Prior Publication Data
US 2013/0119830 A1 May 16, 2013

(30) Foreign Application Priority Data
Jul. 28, 2010 (DE) .......................... 10 2010 038 529

(51) Int. Cl.
*H02K 9/00* (2006.01)
*H02K 1/32* (2006.01)
*H02K 9/19* (2006.01)
*H02K 9/10* (2006.01)
*H02K 1/20* (2006.01)

(52) U.S. Cl.
CPC ................. *H02K 9/005* (2013.01); *H02K 1/32* (2013.01); *H02K 9/10* (2013.01); *H02K 9/19* (2013.01); *H02K 1/20* (2013.01); *H02K 2201/03* (2013.01)

(58) Field of Classification Search
CPC ............ H02K 9/005; H02K 9/19; H02K 1/20
USPC ................................. 310/52–59, 60 R, 61–63
See application file for complete search history.

(56) References Cited

U.S. PATENT DOCUMENTS

| | | | | |
|---|---|---|---|---|
| 2,887,062 A | * | 5/1959 | Cametti et al. | 417/357 |
| 2,917,644 A | * | 12/1959 | Laffoon et al. | 310/64 |
| 2,964,659 A | * | 12/1960 | Steele, III et al. | 310/54 |
| 3,217,193 A | * | 11/1965 | Rayner | 310/54 |
| 3,240,967 A | * | 3/1966 | Krastchew | 310/54 |
| 3,484,636 A | * | 12/1969 | Parker | 310/268 |
| 3,579,006 A | | 5/1971 | Kindl | |
| 3,735,174 A | * | 5/1973 | Bosch et al. | 310/266 |
| 3,791,331 A | * | 2/1974 | Dilley | 440/6 |

(Continued)

FOREIGN PATENT DOCUMENTS

| | | |
|---|---|---|
| CH | 525 582 A | 7/1972 |
| DE | 724 449 C | 8/1942 |

(Continued)

*Primary Examiner* — Thanh Lam
(74) *Attorney, Agent, or Firm* — Henry M. Feiereisen LLC

(57) ABSTRACT

A fluid-cooled electric machine includes a fluid circuit and an integrated pump element which executes a pumping action to conduct fluid through the fluid circuit as a result of a rotational movement of the electric machine. The electric machine includes a stator and a rotor arranged to demarcate with the stator a conical air gap which is flooded with fluid.

8 Claims, 4 Drawing Sheets

(56) References Cited

U.S. PATENT DOCUMENTS

| | | | |
|---|---|---|---|
| 4,496,862 A * | 1/1985 | Weber | 310/56 |
| 4,600,848 A * | 7/1986 | Sutrina et al. | 310/54 |
| 6,346,755 B1 | 2/2002 | Tong et al. | |
| 6,455,977 B2 | 9/2002 | Leyvraz et al. | |
| 7,466,053 B1 | 12/2008 | Radev | |

FOREIGN PATENT DOCUMENTS

| | | |
|---|---|---|
| DE | 12 25 288 B | 9/1966 |
| DE | 19 61 597 U | 6/1967 |
| DE | 12 83 947 B | 11/1968 |
| DE | 25 37 472 A1 | 3/1977 |
| DE | 82 02 319 U1 | 6/1982 |
| DE | 31 50 724 A1 | 7/1983 |
| DE | 100 13 375 A1 | 9/2001 |
| EP | 1 727 258 A2 | 11/2006 |
| GB | 1 296 226 A | 11/1972 |
| RU | 21 58 465 C1 | 10/2000 |

* cited by examiner

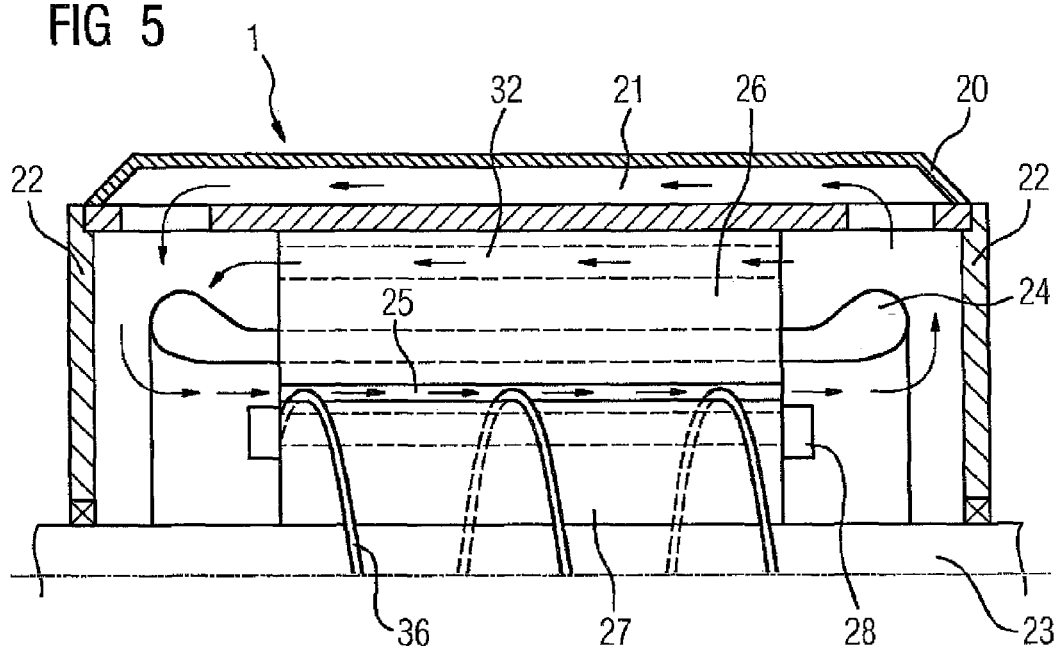
FIG 5
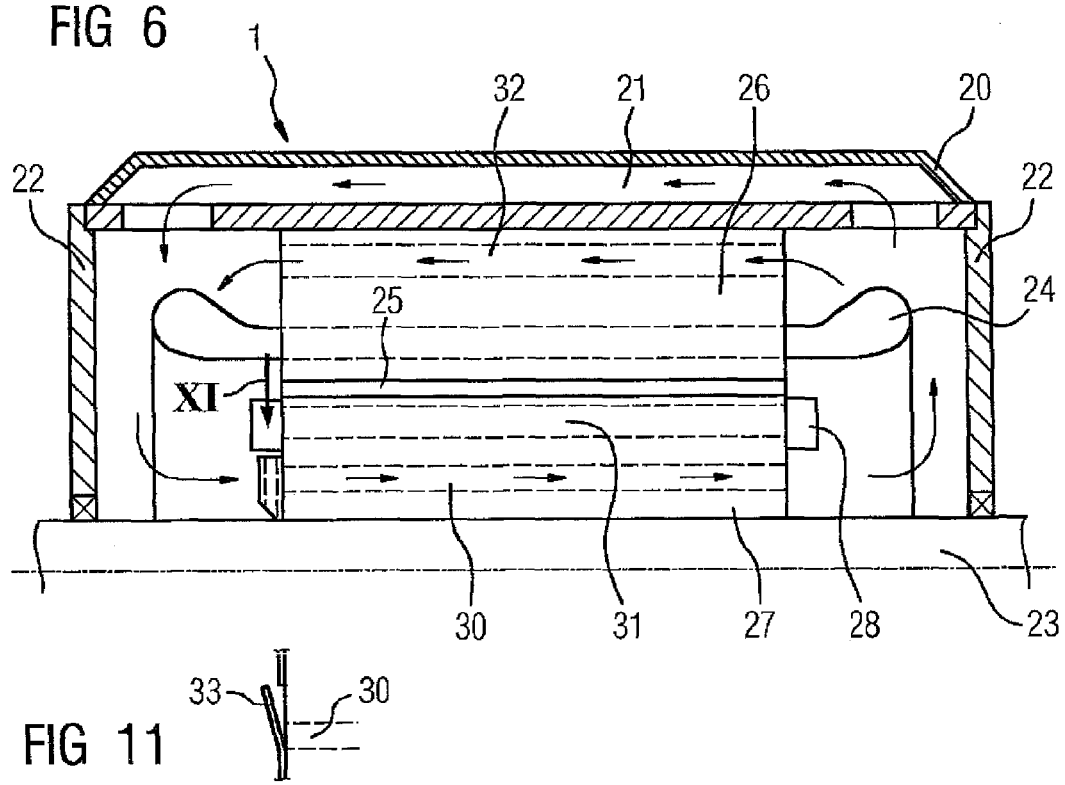
FIG 6
FIG 11

FLUID-COOLED ELECTRIC MACHINE

CROSS-REFERENCES TO RELATED APPLICATIONS

This application is the U.S. National Stage of International Application No. PCT/EP2011/059844, filed Jun. 14, 2011, which designated the United States and has been published as International Publication No. WO 2012/013412 and which claims the priority of German Patent Application, Serial No. 10 2010 038 529.8, filed Jul. 28, 2010, pursuant to 35 U.S.C. 119(a)-(d).

BACKGROUND OF THE INVENTION

The invention relates to an electric machine that can be cooled by means of a fluid. A fluid is e.g. an oil, water, a high-density gas or a high-density refrigerant.

Various mediums can be used for cooling electric machines. If air is used, the electric machine can be cooled by means of an external ventilator or an integrated ventilator. Electric machines can also be cooled by means of a liquid. Examples of liquids include water or an oil.

SUMMARY OF THE INVENTION

The object of the present invention is to improve the fluid cooling of an electric machine.

In the case of fluid-filled (e.g. oil-filled) machines, a wide diversity of systems exists according to the type of cooling. If the electric machine does not have an external cooler, the motor interior can be filled with liquid, in particular oil (e.g. an oil-filled elevator motor). The heat is transmitted by convection to the housing of the electric machine via the oil. If the oil is situated in the air gap of the electric machine, hot spots can occur there. This is due in particular to the heat produced by the rotor and high friction losses. A high-density gas can also be used as a fluid instead of the oil.

In an embodiment of the electric machine comprising an external cooler, the oil or another cooling liquid or a fluid is conveyed through the motor with the aid of a pump (external or internal). A fluid-filled electric machine which does not have an external pump can have an external or internal cooler. By virtue of structural measures at the rotor and/or stator of the electric machine, it is therefore possible to create a fluid flow through the air gap or also through one or more cooling channels in particular, wherein a return can be effected via a bypass. In this way, the cooling of the fluid-filled electric machine can be improved without the use of an external fluid pump. The resulting circulation of the fluid also produces an equalization of the temperature in the total fluid volume. The transport of the fluid and the resulting fluid circuit of the electric machine are caused by its movement. This means that fluid is only actively conveyed (pumped) within the electric machine when the electric machine performs a rotational movement. In order to improve the cooling of the electric machine, a heat exchanger can also be integrated in the circuit of the cooling fluid.

By virtue of the design of an active part of the electric machine, a conveying action (pumping action) of the fluid can be achieved by means of e.g. centrifugal forces, a helix, a worm or possibly the design of a rotor ridge. The fluid (e.g. a liquid) can therefore be conveyed through the air gap or the rotor, for example. In this case, the design of an active part of the electric machine relates to e.g. a stator and/or rotor comprising a conical or stepped air gap, a design of the rotor comprising e.g. one or more axial and/or radial cooling channels or a hollow shaft, or also skewed stator slots.

The conveyance of the fluid in the electric machine results in an equalization of the fluid temperature, such that boiling of liquid in the air gap can be prevented. In conjunction with a bypass for the return of the fluid (in particular oil), whereby the fluid can be cooled further, it is possible to increase the performance of the electric machine by simple means.

As explained above, circulation of the fluid within the electric machine can be achieved without further external devices or auxiliary units, solely by utilizing the rotational movement of the electric machine, wherein a wide diversity of measures can be implemented for this purpose, e.g. in relation to the rotor, the stator, the air gap, etc., in order to achieve a pumping action or conveyance of the fluid in the electric machine. In this case, the fluid can be conveyed through the air gap of the electric machine and/or through cooling channels that are arranged axially or radially. Suitable geometries can be used for this purpose, for example, i.e. an axial or radial design of stator or rotor structures, a suitable modification of endplates or the use of a worm. In order to improve the cooling action in the electric machine, the fluid can be carried into an integrated cooling construction (e.g. hollow ribs). Additionally or alternatively, an external cooler can also be used.

A fluid-cooled (in particular oil-cooled) electric machine can be so designed as to comprise a fluid circuit and an integrated pump, wherein a pumping action can be produced by means of a rotational movement of the electric machine. The object of the invention is correspondingly achieved by fluid-cooled electric machines of this type.

The pump, which is integrated in the electric machine, can be realized using a wide diversity of structural measures. In an embodiment of the fluid-cooled electric machine, said machine comprises a conical air gap that is filled with fluid. This conical form relative to an axis (the axis of rotation of the electric machine) represents the integrated pump. By virtue of the conical positioning of the air gap within the electric machine, whereby the distance to the axis of the electric machine is smaller at the start of the air gap in an axial direction than at the axial end of the air gap of the electric machine, a sucking action is created within the air gap due to the different centrifugal forces, such that fluid in the electric machine and in the air gap can be pumped through the machine.

In an embodiment of the electric machine, the conically positioned fluid-filled air gap has a stepped form. The stepped form can be achieved by means of a sequence of laminated cores having different diameters. This means that the rotor and/or stator features core sections that define the steps of the air gap.

In a further embodiment of the electric machine, the stator winding is conically positioned. By virtue of the conical positioning of the stator winding and the conical embodiment of the air gap, it is possible to maintain a constant distance between stator winding and air gap. If the air gap alone is conically positioned within the electric machine and the stator winding is tangential relative to the axis of the electric machine, different distances are produced between air gap and stator winding.

In a further embodiment of the electric machine, said machine comprises one or more radial channels. In particular, the radial channels are located in the rotor of the electric machine and are filled with fluid, such that fluid within the radial channel is carried outwards radially by centrifugal forces when the rotor moves.

In a further embodiment of the electric machine, said electric machine comprises one or more spiral structures. Use can be made here of a worm construction or helical construction through which fluid can be transported. This spiral structure is located at the rotor of the electric machine in particular, such that a conveying action can be achieved as a result of a rotational movement of said rotor. Cooling channels or cooling tubes can also be constructed in a spiral form and positioned at the rotor in such a way that fluid can be transported through them.

In an embodiment of the electric machine, said machine comprises one or more conically positioned channels, these channels being located in or at the rotor of the electric machine in particular.

The electric machine can be a synchronous machine or an asynchronous machine. Moreover, it can be embodied as an external-rotor motor or an internal-rotor motor.

In an embodiment of the electric machine, the rotor comprises a pump or a multiplicity of pump impellers. Fluid is conveyed by means of these impellers as a result of a rotational movement of the rotor. Depending on the embodiment of the impellers, it is then possible to convey fluid radially outwards or radially inwards towards the axis of rotation.

In an embodiment of the electric machine, pump impellers can be combined such that the pumping action operates radially inwards on a first side of the electric machine and the pumping action occurs radially outwards on another (opposite) side of the electric machine, one side of the electric machine being the driving side and the other side of the electric machine being its driven side, for example.

In a further embodiment of the electric machine, said electric machine comprises stator slots which are skewed and form channels that carry fluid. By virtue of the skewed nature of the stator slots, it is possible not only to reduce a detent torque in the case of a permanent-field electric machine, but also to achieve a pumping action in order to move fluid from a driving side to the driven side or vice versa. Skewed stator slots can be used not only in permanent-field synchronous machines, but also in asynchronous machines, for example.

BRIEF DESCRIPTION OF THE DRAWING

The invention is described and explained in greater detail below with reference to the exemplary embodiments illustrated in the figures, in which:

FIG. 5 shows an electric machine featuring a spiral structure at the rotor, FIG. 6 shows an electric machine comprising pump impellers.

FIG. 11 shows a detailed view from FIG. 6.

DETAILED DESCRIPTION OF PREFERRED EMBODIMENTS

Figure 1:
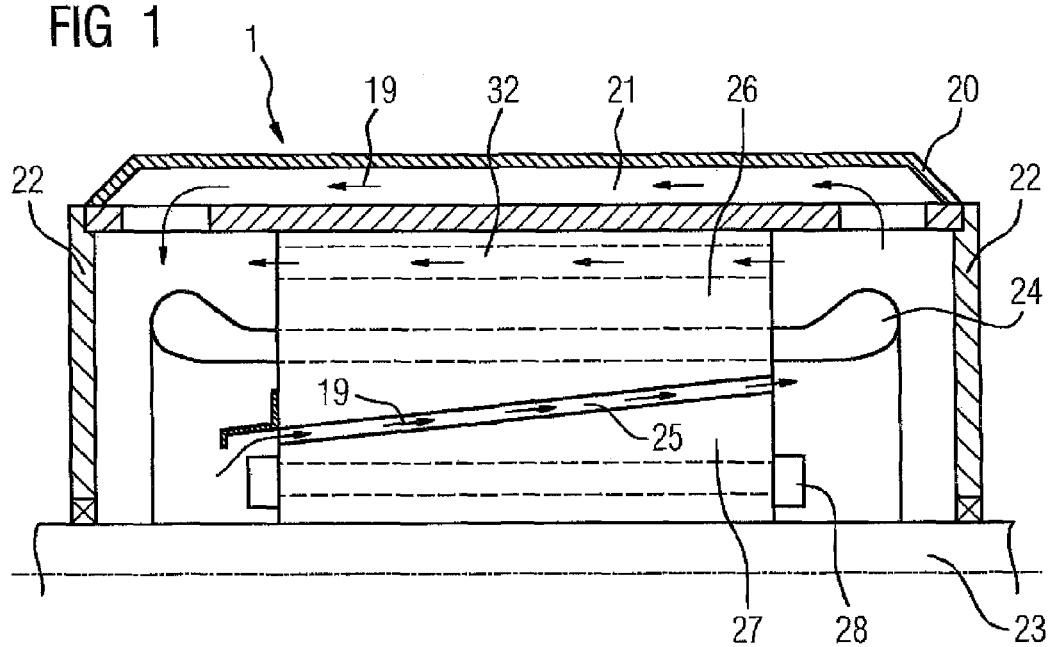
FIG. 1 shows an electric machine comprising a conically positioned air gap.

The illustration according to FIG. 1 shows a partial section through an electric machine 1. The electric machine 1 comprises a stator 26 and a rotor 27. An air gap 25 between rotor 27 and stator 26 is conically positioned within the electric machine 1, such that the distance from the air gap 25 to a shaft 23 changes axially. The electric machine 1 according to FIG. 1 further comprises bearing shells 22 and a hollow rib 20, wherein fluid, in particular cooling liquid, can be carried thorough the cooling channel 21 in the hollow rib. The circuit of the fluid is illustrated by means of arrows 19. The fluid is conveyed axially through the electric machine 1 via the air gap 25 and returned via the channel 21 in the cooling rib 20 and a stator channel 32. By virtue of this circulation of the fluid, which is e.g. oil, both the stator 26 and the rotor 27 of the electric machine 1 are cooled. In the present case, the rotor 27 comprises a cage winding 28.

Further embodiments of an electric machine are illustrated in the following figures, wherein identical elements are denoted by identical reference signs, whereby it is possible to explain in particular the differences in the embodiments of the electric machine, which comprises an integrated pump.

Figure 2:
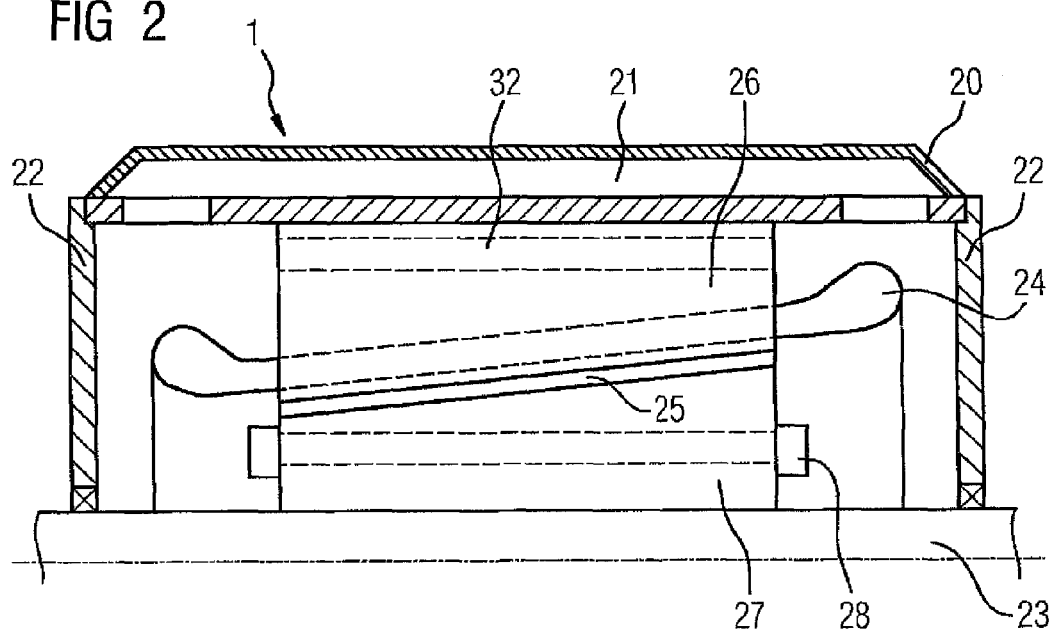
FIG. 2 shows an electric machine comprising a conically positioned stator winding.

The illustration according to FIG. 2 shows an embodiment of the electric machine, which comprises a conically positioned stator winding 24. As in FIG. 1, the air gap 25 is also conically positioned in FIG. 2, the distance between air gap and stator winding being constant according to FIG. 2. By contrast, the distance between air gap and stator winding differs in an axial direction in FIG. 1.

Figure 3:
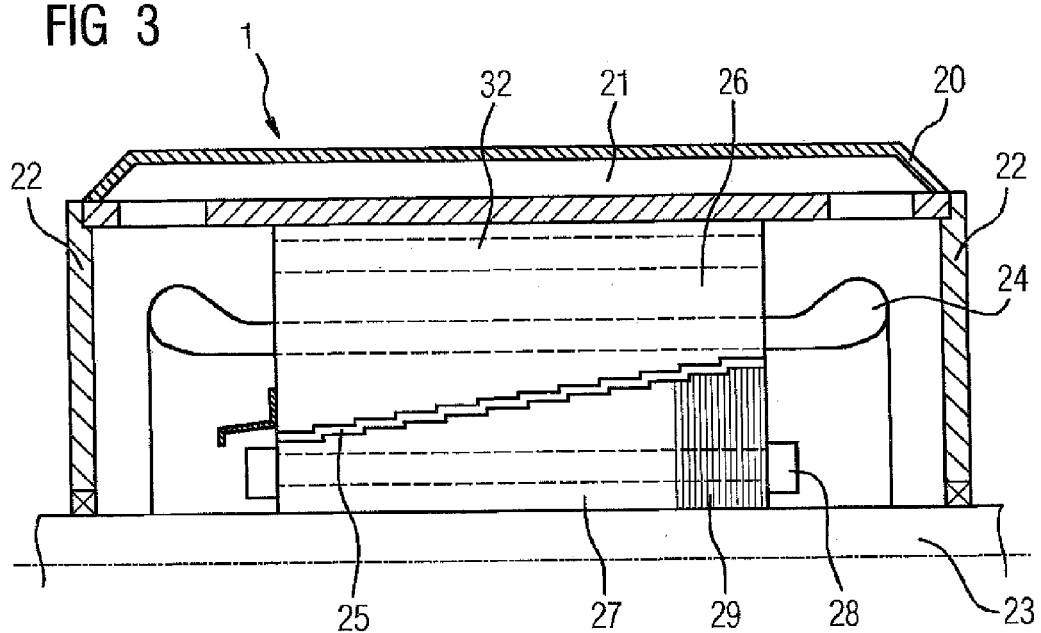
FIG. 3 shows an electric machine comprising a stepped air gap.

The illustration according to FIG. 3 shows a stepped lamination of the rotor 27 and the stator 26. The lamination 29 comprises core sections of identical diameter, wherein the diameters of the core sections differ from each other. The use of stepped forms for the air gap 25 results in a simpler construction of the electric machine in comparison with a continuous change in the diameters of the lamination that is used for rotor and stator.

Figure 4:
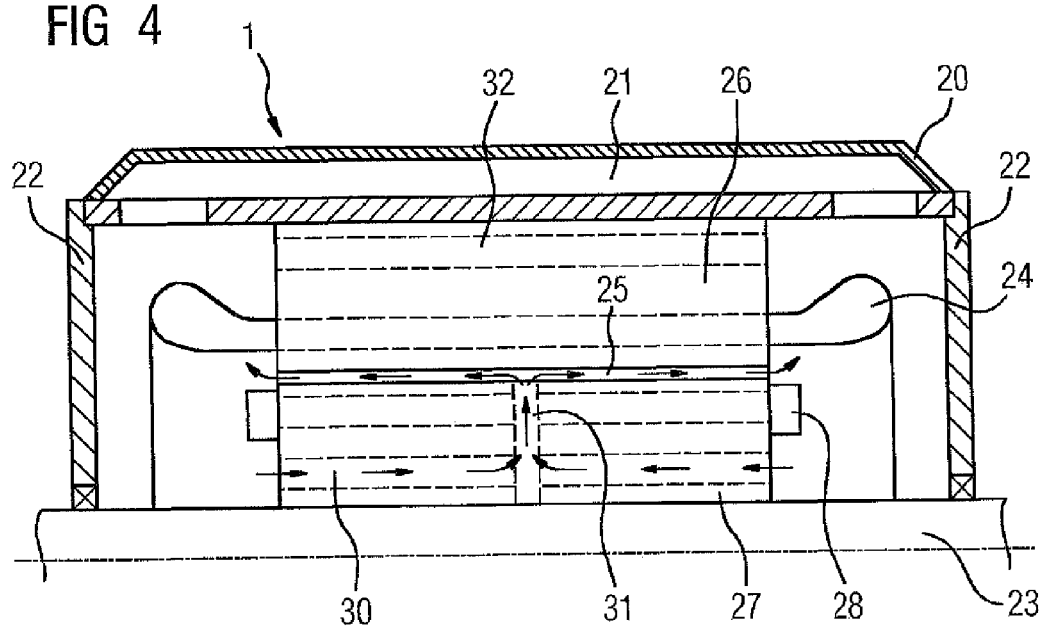
FIG. 4 shows an electric machine comprising a radial channel in the rotor.

The illustration according to FIG. 4 shows axial cooling channels 30 in the rotor 27 and a radial cooling channel 31 in the rotor 27. The fluid circulates in these cooling channels and is transported via the air gap 25 into the region of the winding overhang of the stator winding.

The illustration according to FIG. 5 shows an electric machine comprising a helical structure 36 on the rotor 27. By virtue of the helical structure 36, the fluid is conveyed through the air gap 25 (as indicated by the arrows 19) when the rotor moves.

The illustration according to FIG. 6 shows a pump impeller 33 in the region of an input of a cooling channel 30 in the rotor. By virtue of the pump impeller 33, fluid is carried into the channel 30 when the rotor moves. The illustration according to FIG. 11 shows a detailed view from FIG. 6, in order that the action and/or position of the pump impellers 33 can be identified more easily.

Figure 7:
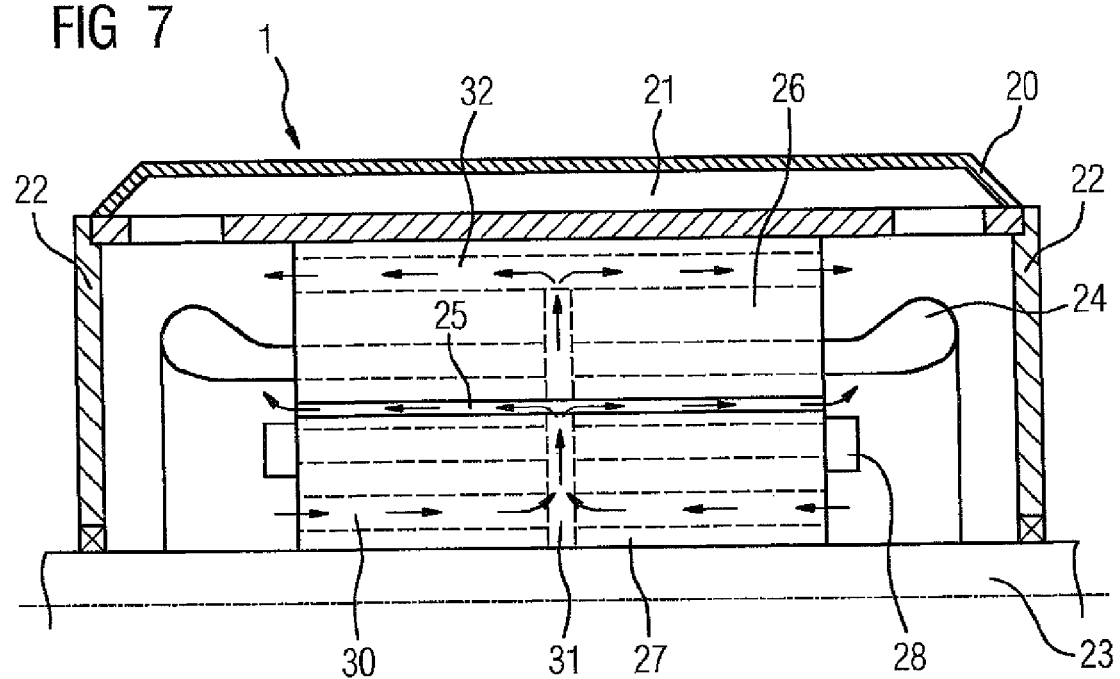
FIG. 7 shows an electric machine comprising a radial channel in the stator.

The illustration according to FIG. 7 shows radial cooling channels 31 in both the rotor 27 and the stator 26. As the stator 26 also comprises adjoining axial cooling channels 32, a novel circulation movement for the fluid can develop from this.

Figure 8:
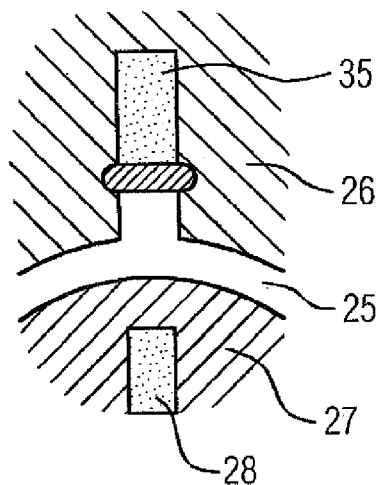
FIG. 8 shows a skewed stator slot.

The illustration according to FIG. 8 schematically shows a section through a skewed stator slot 35, by means of which e.g. oil that is already situated in the air gap 25 is carried through said gap and through the skewed cooling channel when the rotor moves.

Figure 9:
FIG. 9 shows a cross section of a cage ring.
Figure 10:
FIG. 10 shows a further cross section of a cage ring.

The illustrations according to FIG. 9 and FIG. 10 show a detail of a cross section of a cage ring 28. The cage ring 28 according to FIG. 9 has rectangular slots in the region of the outer radius. The cage ring 28 according to FIG. 10 has curved indentations in the region of the outer radius. These slots or indentations represent a type of groove in each case, e.g. a milled groove. In the case of an object as per FIG. 4 or FIG. 7, for example, both cage rings can therefore be equipped with small grooves (having a height in the millimeter range) on the upper side, thereby resulting in a certain spinning action of the liquid (or fluid) upwards and usefully assisting the circulation in this way. Such a feature could also be provided in the case of the objects as per FIG. 5 or FIG. 6, wherein grooves are in particular only present on one cage ring here.

The invention claimed is:

1. A fluid-cooled electric machine, comprising:
   a fluid circuit;
   an integrated pump executing a pumping action to conduct fluid through the fluid circuit as a result of a rotational movement of the electric machine; and
   a stator and a rotor arranged to demarcate with the stator a conical air gap which is flooded with fluid.

2. The fluid-cooled electric machine of claim 1, wherein the conical air gap has a stepped form.

3. The fluid-cooled electric machine of claim 1, wherein the stator has a conically positioned stator winding.

4. The fluid-cooled electric machine of claim 1, wherein the fluid circuit includes a radial channel in fluid communication with the air gap.

5. The fluid-cooled electric machine of claim 1, constructed in the form of a spiral structure.

6. The fluid-cooled electric machine of claim 1, wherein the air gap has a conical configuration.

7. The fluid-cooled electric machine of claim 1, wherein the pump has a pump impeller which is coupled to the rotor.

8. The fluid-cooled electric machine of claim 1, wherein the stator has a skewed stator slot.

* * * * *